Patented July 10, 1945

2,380,356

UNITED STATES PATENT OFFICE 2,380,356

INTERPOLYMERS OF VINYLIDENE HALIDES AND 1,3-DIENES AND PROCESS OF PRODUCING THE SAME

Mortimer A. Youker, Cragmere, Del., assignor to E. I. du Pont de Nemours & Company, Wilmington, Del., a corporation of Delaware No Drawing. Application August 19, 1941, Serial No. 407,417

6 Claims. (Cl. 260—92.5)

This invention relates to new polymeric materials obtained by polymerizing vinylidene halides and 1,3-butadiene hydrocarbons and to methods for carrying out such polymerization.

It has been disclosed in U. S. Patent No. 2,215,379 that mixtures consisting of vinylidene chloride and a 1,3-butadiene hydrocarbon containing from 50 to 65 per cent of the latter may be polymerized while dispersed in sodium oleate solution to give plastic, rubber-like material, but that mixtures outside this range do not give useful results. Thus, it is stated that, with less than 50 per cent of 1,3-butadiene, no polymerization takes place and with more than 65 per cent of 1,3-butadiene, the product tends to "granulate" and does not have the "tough but soft nature" of the product obtained from the mixtures containing between 50 and 65 per cent of 1,3-butadiene.

It is an object of this invention to discover an improved process for polymerizing mixtures of vinylidene halides and 1,3-butadiene hydrocarbons. Another object is to provide new synthetic products by polymerizing mixtures of vinylidene halides and 1,3-butadiene hydrocarbons in proportions never before successfully used. Other objects will appear hereinafter.

It has now been found that new synthetic products and better yields of old synthetic products can be produced by polymerizing mixtures of vinylidene chloride and 1,3-butadiene in aqueous dispersions in the presence of an alkali metal hydroxide. Vinylidene bromide and vinylidene chlorobromide may be used in place of vinylidene chloride; also isoprene and 2,3-dimethyl-1,3-butadiene may be used in place of 1,3-butadiene.

In order that the process may be more fully understood, the following specific examples are given. Such examples are merely by way of illustration. The invention is not limited thereto, but suitable variations may be made as will become more apparent hereinafter.

Example I

The charge consisting of 80 parts of 1,3-butadiene, 20 parts of vinylidene chloride, and 3 parts of carbon tetrachloride was dispersed in 125 parts of water containing 3.75 parts of sodium oleate, 0.83 part of sodium perborate and 2 parts of sodium hydroxide. The dispersion and polymerization were brought about in thick-walled glass tubes which were rotated about a horizontal axis perpendicular to the length of the tube at the rate of about 25 revolutions per minute for 112 hours at 50° C. The resulting uniform latex-like dispersion of the polymer was coagulated with ethyl alcohol, washed with warm water on a corrugated mill and then dried on a rubber mill with smooth rolls. The yield was 93 per cent of a plastic, rubber-like material which could be readily milled, compounded, and cured as in the following example. It contained about 13 per cent of chlorine corresponding to about 18 per cent of combined vinylidene chloride.

Example II

Fifty (50) parts of 1,3-butadiene and 50 parts of vinylidene chloride were polymerized as in Example I, except that 1.5 parts of sodium hydroxide was used. The yield was 90 per cent of a product containing 42 per cent of combined vinylidene chloride. Two (2) parts of phenyl-alpha-naphthylamine were incorporated into the product as it was being milled. One hundred (100) parts of the product was compounded according to the procedure used for natural rubber with 2 parts of sulfur, 2 parts of stearic acid, 50 parts of channel black, 5 parts of zinc oxide, and 1 part of mercapto benzothiazole and cured for 30 minutes in a mold at 131° C. The tensile strength was 2520 pounds and the elongation at break, 300 per cent.

Example III

Twenty (20) parts of 1,3-butadiene and 80 parts of vinylidene chloride were polymerized as in Example I, using 2 parts of sodium hydroxide. The yield was 74 per cent of a product containing 69 per cent of combined vinylidene chloride. It was intermediate in properties between a rubber and a synthetic resin, being tough and elastic when cold but plastic and readily milled or otherwise processed at somewhat elevated temperatures. When compounded and cured as in the preceding example, it gave a hard, tough, somewhat extensible material approaching ebonite in its properties, but having the advantage of greater flexibility.

Example IV

Seventy (70) parts of 1,3-butadiene, 30 parts of vinylidene chloride, and 0.5 part of octyl mercaptan, were dispersed in 118 parts of water containing 4 parts of sodium oleate, 0.5 part of sodium hydroxide, 1 part of ammonium persulfate, and 1 part of the sodium salts of the dinaphthyl methane sulfonic acids prepared from naphthalene, sulfuric acid, and formaldehyde according to U. S. Patent No. 1,336,759. This charge was polymerized in the apparatus described in Example I for 65 hours at 30° C. The resulting uniform latex-like dispersion of the polymer was treated with 2.5 parts of a liquid mixture of antioxidants consisting of 55 parts of phenyl-alpha-naphthylamine and 45 parts of diphenylamine dispersed in a solution of sodium oleate and the naphthalene sodium sulfonates described above. The treated dispersion was then coagulated by adding acetic acid and saturated sodium chloride solution. The coagulum was washed and dried as in Example I. Sixty-seven (67) parts of a plastic rubber-like product was obtained which contained about 13 per cent of chlorine, corresponding to about 18 per cent of combined vinylidene chloride.

One hundred (100) parts of the product was compounded according to the procedure used for the compounding of natural rubber, with 50 parts of channel black, 5 parts of zinc oxide, 1.5 parts of sulfur, 2 parts of stearic acid, 3 parts of a high boiling phenolic rubber softener, 1.5 parts of paraffin wax and 1.3 parts benzothiazyl dimethylsulfinimide. When cured for 30 minutes at 40 pounds steam pressure (131° C.) the vulcanizate had a tensile strength of 2630 pounds per square inch, required a stress of 960 pounds per square inch for 300 per cent elongation, and had an elongation at break at 490 per cent.

The vulcanized product of Example IV was subjected to the following tests for evaluating its behavior at low temperatures. A sample of uniform cross section was stretched 170 per cent and cooled to −70° C. in this stretched condition. The sample was then allowed to contract freely as the temperature was slowly raised. The temperature at which 10, 50, and 80 per cent retraction took place, was recorded. The per cent retraction is the decrease in length of the sample on warming divided by the length by which the sample was originally sketched. The lower the temperature for a given retraction, the greater the so-called freeze resistance. In another type of test, the test pieces were stretched 170 per cent and kept for 16 hours at −35° C. The tension was then released and the pieces were allowed to contract freely at −35° C. The percentage retraction at once and after 1 and 10 minutes was recorded. The following table compares the behavior in these tests of the product of Example IV and a polymer prepared by polymerizing 1,3-butadiene in aqueous dispersion in the absence of other polymerizable materials. The latter is one of the most freeze resistant synthetic rubbers hitherto known. For natural rubber, the temperature for 10 per cent retraction is −42° C., for 80 per cent, −2° C.

|  | Product of Ex. IV | Butadiene polymer |
|---|---|---|
| Temperature for 10% retraction____°C____ | −59 | −65 |
| Temperature for 50% retraction____do____ | −49 | −34 |
| Temperature for 80% retraction____do____ | −37 | −21 |
| Retraction at −35° C. at once___percent__ | 40 | 20 |
| Retraction after 1 minute_____do____ | 70 | 35 |
| Retraction after 10 minutes_____do____ | 80 | 40 |

When the octyl mercaptan used in Example IV was replaced by 10 parts of carbon tetrachloride, the vulcanizate was much less distensible; that is, a stress of 1670 pounds per square inch (instead of 960) was required for 300 per cent elongation. When Example IV was carried out at 35° C. instead of 30° C., the yield was increased to 70 per cent.

Example V

Seventy (70) parts of 1,3-butadiene and 30 parts of vinylidene chlorobromide, $CH_2\!=\!CClBr$, were polymerized as in the preceding example for 64 hours at 30° C. The yield was 63 per cent of a product containing 23 per cent of the combined chlorobromide. When compounded and cured, it was similar in physical properties to the product of Example IV.

Example VI

Fifty (50) parts of 1,3-butadiene and 50 parts of vinylidene chloride were polymerized as described in Example IV except that the time was 64 hours and the temperature 35° C. When similarly worked up, the yield was 87 per cent of a homogeneous plastic product which was shown by chlorine analysis to contain about 37 per cent of combined vinylidene chloride.

When 100 parts of product prepared in this manner was compounded with 50 parts of channel black and 5 parts of zinc oxide only and cured for 30 minutes at 131° C., there was obtained a hard, slightly distensible vulcanizate approaching ebonite in properties and having a tensile strength of 2500 pounds per square inch and an elongation of 50 per cent at break. When 2 parts of magnesium oxide was included, the vulcanizate was entirely different, being very soft, distensible, and capable of being stretched 700 per cent. The further addition of 2 parts of sulfur and 2 parts of tetramethyl thiuram disulfide gave a compound which was vulcanized under the very mild conditions of 15 minutes at 109° C. to give a tensile strength of 2010 pounds per square inch at 310 per cent elongation. This vulcanizate increased only 79 per cent in volume when immersed in kerosene for 48 hours at 100° C. When only 2 parts sulfur and 2 parts of the thiuram disulfide, but no carbon black or metal oxide were used, a snappy soft vulcanizate was still obtained.

Example VII

Forty (40) parts of 1,3-butadiene and 60 parts of vinylidene chloride were polymerized as in Example IV. The yield was 75 parts of a homogeneous plastic product shown by chlorine analysis to contain approximately 44 per cent of combined vinylidene chloride. When compounded as in Example IV, the tensile strength was 2380 pounds per square inch with an elongation at break of 70 per cent, using the same curing conditions.

Example VIII

Forty (40) parts of 1,3-butadiene, 30 parts of vinylidene chloride, and 30 parts of methyl methacrylate were polymerized exactly as the 100 parts of polymerizable compounds in Example IV except that the temperature of polymerization was 35° C. The product, obtained in 100 per cent yield, was plastic and easily milled, and, when compounded and cured as described in Example IV, gave a tensile strength of 2960 pounds and an elongation of 200 per cent. When 2 parts of magnesium oxide was added to the compounding formula, the tensile strength was 4100 pounds and the elongation 360 per cent.

Although this invention has been described so far in terms of 1,3-butadiene, it is also applicable to the homologues of 1,3-butadiene, such as isoprene and 2,3-dimethyl-1,3-butadiene. It is also applicable to vinylidene bromide as well as to vinylidene chloride and vinylidene chloro bromide used in the examples. In general, it is preferred to have present in the original mixtures of polymerizable compounds at least 10 per cent and not more than 90 per cent of the vinylidene halides. As illustrated in the examples, increasing the proportion of the vinylidene halides in the starting material increases the amount combined in the interpolymer, and, accordingly, gives products which differ more and more from the polymer obtained from butadiene alone and approach in properties the polymers obtained from the vinylidene halides alone. Products of predominately rubber-like characteristics are obtained when the proportion of vinylidene halides in the starting material is less than about 65 per cent. Of this group, those made with less than about 35 per cent of vinylidene halide in the starting material have the outstanding resistance to stiffening at low temperatures discussed above. The products obtained by the use of more than 65 per cent of vinylidene halide, for example, those described in Examples III and VII, are essentially resins modified so as to have improved plasticity and extensibility, and, thus, have rubber-like properties to a minor, but still important, degree.

Other polymerizable compounds may be present along with the vinylidene halides as illustrated in Example VIII. The preferred compounds for this purpose are those which readily form interpolymers with 1,3-butadiene, such as styrene, acrylic nitrile, and the esters of the acrylic acids, particularly methyl methacrylate.

Various agents may be present to influence the nature of the product. Thus, the presence of carbon tetrachloride, given in the first three examples (and of similar compounds containing more than one chlorine atom on the same carbon atom), improve somewhat the plasticity of the product. A greater effect in this direction is obtained by aliphatic mercaptans containing more than 2 carbon atoms, such as amyl and octyl mercaptan, as in the other examples. These mercaptans have the additional effect of increasing the speed of polymerization and increasing the distensibility of the vulcanized products.

It is often desirable to add the 1,3-butadiene in increments or continuously to the vinylidene chloride during the course of the polymerization rather than to add it all at the start of the reaction. This modification of the procedure increases the yield and the proportion of vinylidene chloride combined in the interpolymer.

The plasticity of the product may also be increased by the method of U. S. Patent No. 2,234,204, which involves polymerizing, in the presence of sulfur, and treating the resulting polymer with various sulfur compounds such as thiuram disulfides, thiazyl sulfides, dithiocarbamates, and mercaptans.

Any emulsifying agent may be used which gives stable dispersions in aqueous alkaline solutions. The soluble salts of the higher fatty acids, such as lauric, stearic, palmitic, and oleic are particularly effective in this connection and of these the sodium oleate used in the examples is preferred. The stability of the dispersions may be further increased by the presence of the salts of alkyl substituted naphthalene sulfonic acids, such as used in Example IV. It is usually preferred to use a polymerization catalyst, which is preferably a persulfate, ammonium persulfate being particularly preferred, but an inorganic or organic peroxide, a perborate, percarbonate, or similar agent may be used.

As already stated, an essential feature of this invention is the presence, during the polymerization, of added alkali, in excess of those small amounts of sodium hydroxide arising from the hydrolysis of the dispersing agent. Other hydroxides in equivalent amounts may, of course, be used, provided they do not form insoluble products with the other ingredients of the reaction mixture. In many cases, a maximum effect upon the yield of polymer is obtained when the equivalent of about 2 per cent of sodium hydroxide, based on the total weight of polymerizable material added, is used. The preferred range is from about 0.5 to about 3.0 per cent. Desirable effects are obtained, however, with even less than 0.5 or more than 3.0 per cent.

As shown in the examples, the temperature of polymerization may be from 30° C. to 50° C., although both higher and lower temperatures may also be used. It is preferred, however, to carry out the polymerization at about 30° C. to 35° C., adjusting the caustic concentration and using active polymerization accelerators such as ammonium persulfate in order to shorten the time of polymerization. Working at the lower temperatures has the advantage that the pressures are also lower and, consequently, heavy and elaborate equipment is not required to confine the 1,3-butadiene. Furthermore, it has been found that polymers prepared at the lower temperatures are superior in working properties and also in the physical properties of their vulcanizates. Satisfactory operation at low temperatures is one of the most important practical advantages of the present invention over the prior art.

The coagulation of these dispersions may be brought about by any of the suitable methods already described in the art. Thus, they may be coagulated by the addition of alcohol or salts, such as sodium chloride, magnesium sulfate, or aluminum sulfate, or, where a salt of a fatty acid is the only emulsifying agent, by the addition of acid. A generally applicable method of coagulation consists in freezing in thin layers as described in U. S. Patent No. 2,187,146. The precise method used is, in general, not critical for the formation of a satisfactory product. It is usually desirable, however, to remove the dispersing agent from the coagulum, for example, by washing with alcohol or water, or to convert it into an inert material. Thus, when sodium oleate is the dispersing agent, it may be coagulated with magnesium sulfate, which converts it to the insoluble magnesium oleate.

It is desirable to protect the polymer against oxidation by the addition of an antioxidant, for example, aromatic secondary amines as in the examples. These are preferably added to the dispersion before coagulation and immediately after the polymerization has been concluded.

The compounding and curing of the products is carried out along the lines used for natural rubber, but, as will be noticed in the examples, it is possible to bring about very great changes in the physical properties of the vulcanizates by relatively slight changes in the compounding ingredients. Thus, it is possible to obtain vulcanizates varying from very soft distensible products of exaggerated rubber-like properties to hard products approaching ebonite. The latter effect may be brought about without the use of sulfur, unlike the corresponding conversion of natural rubber to ebonite, for which large proportions of sulfur are required. Magnesium oxide, in particular, and also carbon black, sulfur, and the rubber accelerators have particularly pronounced effects upon the properties of the vulcanizates.

It will be apparent from the above discussion that the products of the present invention are well suited to a wide variety of uses. Thus, those containing the lower amounts of combined vinylidene chloride may be used in place of natural rubber. These may, accordingly, be used in all applications in which a resilient and elastic product is required. In particular, because of the superior resistance of the rubber-like product of this invention to the swelling action of solvents, and particularly because of their much improved freeze resistance in comparison with natural rubber, they may be used for many purposes. For example, they may be used in gaskets and other parts exposed to petroleum products and in automobile and airplane parts exposed to low temperatures where natural rubber cannot be used or is unsatisfactory. On the other hand, these products containing larger amounts of combined vinylidene chloride may be used in the manufacture of coating, impregnating, and molding composition and have the advantage over synthetic resins commonly used for these purposes of having in part the flexibility, distensibility and resilience characteristics of the natural rubber and 1,2-butadiene polymers. These properties may, of course, be varied at will by varying the proportion of 1,3-butadiene hydrocarbon used in the preparation of the polymer. Moreover, the products of the present invention are peculiar in that the physical properties of their vulcanizates may be varied to such a surprising extent by changes in the compounding ingredient. Thus, even without changing the composition of the polymer, the physical properties of vulcanizates may be altered to an extent not possible with other products of this type.

It is apparent that many widely different embodiments of this invention may be made without departing from the spirit and scope thereof, and, therefore, it is not intended to be limited except as indicated in the appended claims.

I claim:

1. A process which comprises polymerizing a mixture of a vinylidene halide of the group consisting of vinylidene chloride, vinylidene bromide, and vinylidene chlorobromide with a diene of the group consisting of 1,3-butadiene, isoprene, and 2,3-dimethyl-1,3-butadiene while in an aqueous dispersion in the presence of an alkali metal hydroxide, the latter being present in the amount of about 0.5 to 3.0 per cent based on the amount of polymerizable material present.

2. A process which comprises polymerizing a mixture of vinylidene chloride and 1,3-butadiene in an aqueous dispersion in the presence of an alkali metal hydroxide, the latter being present in the amount of about 0.5 to 3.0 per cent based on the amount of polymerizable material present.

3. A process which comprises polymerizing a mixture of vinylidene chloride and 1,3-butadiene in an aqueous dispersion in the presence of sodium hydroxide, the latter being present in the amount of about 0.5 to about 3.0 per cent based on the amount of polymerizable material present.

4. A process which comprises polymerizing a mixture of vinylidene chloride and 1,3-butadiene in an aqueous dispersion in the presence of sodium hydroxide, the latter being present in the amount of about 0.5 to about 3.0 per cent based on the amount of polymerizable material present, a small amount of an aliphatic mercaptan also being present.

5. A rubber-like synthetic product made by polymerizing a mixture of from 10 to 35 per cent vinylidene halide of the group consisting of vinylidene chloride, vinylidene bromide, and vinylidene chlorobromide with from 90 to 65 per cent diene of the group consisting of 1,3-butadiene, isoprene, and 2,3-dimethyl-1,3-butadiene while in an aqueous dispersion in the presence of an alkali metal hydroxide, the latter being present in the amount of about 0.5 to 3.0 per cent based on the amount of polymerizable material present.

6. A rubber-like synthetic product made by polymerizing a mixture of from 10 to 35 per cent vinylidene chloride with from 90 to 65 per cent 1,3-butadiene, while in an aqueous dispersion in the presence of an alkali metal hydroxide, the latter being present in the amount of about 0.5 to 3.0 per cent based on the amount of polymerizable material present.

MORTIMER A. YOUKER.